US006753068B2

(12) United States Patent
Nakamura et al.

(10) Patent No.: US 6,753,068 B2
(45) Date of Patent: Jun. 22, 2004

(54) DECORATIVE PLATE, AND DECORATIVE ARTICLE AND TIMEPIECE USING THE SAME

(75) Inventors: Yuichi Nakamura, Nagano-ken (JP); Sachio Kasahara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 120 days.

(21) Appl. No.: 10/041,884

(22) Filed: Oct. 18, 2001

(65) Prior Publication Data

US 2002/0068148 A1 Jun. 6, 2002

(30) Foreign Application Priority Data

Oct. 18, 2000 (JP) ....................................... 2000-318542
Jul. 16, 2001 (JP) ....................................... 2001-215806

(51) Int. Cl.7 ............................ B32B 3/00; A47K 35/00

(52) U.S. Cl. ....................... 428/172; 428/142; 428/161; 428/163; 428/167; 428/187; 428/542.2; D10/123

(58) Field of Search ................................ 428/156, 167, 428/172, 542.2, 913.3; 359/574, 575, 742; 63/21, 34; D10/123

(56) References Cited

U.S. PATENT DOCUMENTS 4,588,259 A * 5/1986 Sheiman ..................... 350/132
5,285,314 A * 2/1994 Futhey ....................... 359/565

* cited by examiner

*Primary Examiner*—Donald J. Loney
(74) *Attorney, Agent, or Firm*—Mark P. Watson

(57) ABSTRACT

In carving a decorative groove (7) formed in V-shape cross section extending from inside to outside on a dial plate (2) of a timepiece as a decorative plate, the slant angle of an inner slanted side (7A) forming the V-shape of the decorative groove (7) is made gentler than an outer slanted side (7B) at an inner part of the spiral, so that action of light reflected on the flat surface of the dial plate (2) macroscopically becomes similar to the light reflected on a bulging surface to give the central portion of the dial plate (2) a bulging appearance, whereby a three-dimensional effect is provided by the decorative groove (7) even when the dial plate (2) is made of a thin plate, thereby adding depth and a luxurious touch or aspect.

7 Claims, 16 Drawing Sheets

DECORATIVE PLATE, AND DECORATIVE ARTICLE AND TIMEPIECE USING THE SAME

BACKGROUND OF THE INVENTION

1. Field of the Invention

The present invention relates to a decorative plate having superior appearance by having a decorative groove carved thereon, a method of manufacturing the same, and a decorative article and timepiece using the decorative plate.

2. Description of the Related Art

Conventionally, a dial plate used for a wristwatch has been produced with a thin plate material of 0.4 mm thickness, such as a plate made from brass, in order to minimize the overall thickness of the wristwatch.

Specifically, in order to produce the dial plate, after the thin sheet-shape plate material is formed in a shape corresponding to the design of the wristwatch body and a center hole for inserting a driving shaft for driving the pointer is formed at the center thereof, a leg for securing to a movement is attached by welding etc.

Subsequently, the surface of such dial plate is ground and polished, and, after a decorative pattern such as radial pattern, moiré pattern, matrix pattern or spiral pattern is formed thereon by press stamping etc., the dial plate is plated and is colored by coating a paint including a pigment on the plating as necessary, which is further finished with clear coating.

And finally, a time and minute graduation for indicating time is printed thereon and a metal abbreviated character as a separate body is bonded to finish the dial plate.

In the spiral pattern, among the above decorative patterns, a pattern having a spiral groove is formed by moving a cutting edge, such as cemented carbide tool provided on a lathe, in a diametric direction of a rotary table while rotating the dial plate fixed to the rotary table to carve a groove of approximately 0.012 to 0.05 mm pitch and approximately 0.05 mm depth in spiral.

The pattern formed by a spiral groove has an appearance like a phonograph record without an uneven pitch and, since the groove works as a diffraction grating, reflected light varies in attractive rainbow colors according to the visual angle.

Such pattern formed by a spiral groove can be used not only for the dial plate of a wristwatch, but also as a decorative plate of knob of furniture or of an electric appliance, or as a decorative plate of accessories such as a necklace, cuff links or necktie pin.

However, such conventional decorative plate is planar and lacks a three-dimensional effect since it is produced from a thin plate, even when such pattern formed by spiral groove is provided, so that depth and luxurious touch cannot be afforded.

The three-dimensional effect can be created by forming the decorative plate in convex and concave lens or in Fresnel lens-shape. However, when the decorative plate is formed in a lens-shape, the thickness thereof may increase, thus making it difficult to be produced from a thin plate material.

Especially, a decorative plate used for a dial plate of wristwatch is extremely difficult to produce when the thickness of the dial plate is increased due to restrictions in design and production of the wristwatch.

Alternatively, a thick plate material may be three-dimensionally shaped using a NC carving machine etc. However, in this case, the thickness of the decorative plate and production cost thereof can increase greatly.

OBJECTS OF THE INVENTION

An object of the present invention is to provide a decorative plate having a three-dimensional effect, depth and luxurious touch even when produced from a thin plate, a method of manufacturing thereof, and a decorative article and timepiece using the decorative plate.

SUMMARY OF THE INVENTION

A first aspect of the present invention is a decorative plate including: a decorative portion carved with a decorative groove extending in spiral from inside toward outside of the decorative plate, the decorative groove being formed in a cross section of V-shape and including a non-equilateral portion where a slant angle of one of a pair of slanted sides forming the V-shape is different from a slant angle of the other slanted side.

According to the above first aspect of the present invention, by making the slant angle of an inner slanted side forming the V-shape of the decorative groove gentler than an outer slanted side at an inner part of the spiral, since the action of light reflected on the flat surface of the dial plate macroscopically becomes similar to the light reflected on a bulging surface, the central portion of the dial plate appears to be bulging. Accordingly, the decorative portion can achieve a three-dimensional effect even when the dial plate is made of thin plate.

On the other hand, by making the slant angle of an inner slanted side forming the V-shape of the decorative groove steeper than an outer slanted side, since the action of light reflected on the flat surface of the dial plate macroscopically becomes similar to the light reflected on an indented surface, the decorative portion can appear indented, thereby also achieving a three-dimensional effect even when the dial plate is made of thin plate.

The material of the decorative plate may be metal such as copper, bronze, German silver and aluminum, synthetic resin, glass, shell such as mother of pearl black and mother of pearl and precious stone, and composite material made by attaching thin plates of the above materials.

In the above decorative plate, the slant angles of the pair of slanted sides of the decorative groove may preferably vary gradually from the inner part of the spiral toward the outer part to be equal at the outer part.

Accordingly, when the slant angle of the V-shaped slanted sides vary greatly, the surface can be shown in steeply inclined manner and the slant angle is shown gentler as the slant angles of the V-shaped slanted sides become closer to each other.

For instance, when a decorative groove where the slant angle of the inner slanted side of the spiral is gentler than the outer slanted side and the slant angles of the slanted sides become gradually equalized from the inner part of the outer part of the spiral is provided on the disk-shaped material plate, a decorative plate having apparently greatly bulging central portion and flat peripheral portion as shown in FIG. 1 can be obtained.

On the other hand, when a decorative groove where the slant angle of the inner slanted side of the spiral is steeper than the outer slanted side and the slant angles of the slanted sides become gradually equalized from the inner part of the outer part of the spiral is provided on the disk-shaped material plate, a decorative plate having apparently greatly dented central portion and flat peripheral portion as shown in FIG. 2 can be obtained.

By forming such decorative groove, even when the decorative plate is made of thin plate, an apparent greater thickness relative to actual thickness thereof can be exhibited even when the decorative plate is made of thin plate.

In the above decorative plate, a decorative plating layer may preferably be provided at least on the decorative portion and the plating step for forming the decorative plating layer on the decorative portion may preferably be conducted after the carving step for carving the decorative groove.

By thus forming the decorative plating layer on the decorative portion, even when the decorative plate is made of synthetic resin, a three-dimensional effect can be achieved on the decorative plate by providing the decorative portion on the decorative plate.

When a precious metal layer having superior corrosion resistance is used as the decorative plating layer, even when an easily-carved metal of inferior corrosion resistance such as brass is used as the material of the decorative plate, superior corrosion resistance can be applied to the decorative plate and beautiful appearance can be maintained for a long time and the decorative groove can be easily carved on the decorative plate.

The decorative plating layer may be formed by silver, gold, rhodium and nickel.

In the decorative plate, a colored coating layer including a pigment may preferably be provided at least on the decorative portion and the coating step for forming the colored coating layer including the pigment on the decorative portion may preferably be performed after carving step for carving the decorative groove.

When the thickness of the colored coating layer is reduced, the effect of the decorative groove is not impaired and a variety of decorative plates can be obtained by preparing a plurality of different colors of paint for forming the colored coating layer. Further, since the colored coating layer can protect the decorative portion, weather resistance of the decorative portion can be improved, thereby maintaining the effect of the decorative groove for a long time.

Further, when a see-through paint is used as a paint for forming the colored coating layer and the color of apparently indented portion is thickened, the three-dimensional effect created by the decorative groove can be further emphasized.

In the above decorative plate, a transparent coating layer including no pigment may preferably be provided at least on the decorative portion and the transparent coating step for forming a transparent coating layer including no pigment on the decorative portion may preferably be performed after the carving step for carving the decorative groove.

The advantage of the decorative groove is not impaired at all when the transparent coating layer is thickly formed so as to completely cover the decorative groove provided on the decorative portion inside the coating layer.

Accordingly, the entire surface of the decorative plate including the decorative portion can be made flat by forming the transparent coating layer, thereby facilitating printing and setting time-indicating abbreviated characters onto the decorative plate.

Since the transparent coating layer is relatively rigid and water-resistant, even when the decorative plate and the colored coating layer are soft and fragile, the transparent coating layer protects the decorative plate and the colored coating layer, thereby improving weather resistance of the decorative portion and maintaining the effect of the decorative groove for a long time.

In the above arrangement, at least one of a grinding process and polishing process may preferably be conducted on the surface of the transparent coating layer.

By performing a grinding process and polishing process on the decorative plate provided with the transparent coating layer thick enough to completely cover the decorative groove of the decorative portion thereinside, the surface of the decorative portion can be made substantially flat without irregularity, thereby enhancing glossiness and transparency of the decorative plate and further emphasizing depth and adding a luxurious touch to the decorative plate.

A second aspect of the present invention is a method of manufacturing a decorative plate according to the first aspect of the present invention.

Specifically, the second aspect of the present invention is a method of manufacturing a decorative plate including a decorative portion formed with a decorative groove extending in spiral from an inner side toward an outer side and being formed in a V-shape cross section by carving a surface of a workpiece, in which a tool having an isosceles-triangle front edge and a right-triangle side edge is used for carving the decorative groove, and, wherein, in the carving step, one of the front edge and the side edge is directed initially in a carving direction and the direction of the tool relative to the carving direction is gradually changed from the one of the front edge and the side edge to the other of the front edge and the side edge.

According to the above second aspect of the present invention, the decorative groove having a slant angle of one of the pair of slanted side different from the other can be carved. Further, the slant angles of the slanted side of the carved decorative groove gradually vary to be equal with each other, thereby producing the decorative plate according to the first aspect of the present invention.

In the above method of manufacturing a decorative plate, the tool may preferably be brought into contact with the workpiece while rotating the workpiece, and the tool may preferably be moved along a straight line offset relative to radius direction of a rotary shaft for rotating the workpiece to carve the workpiece.

According to the above arrangement, when a first end of the moving path of the tool is located at a point adjacent to a rotary shaft and on a radius orthogonal with the moving path, the tool's edge side faces the carving direction and front side approximately faces the carving direction on the other end of the moving path.

Accordingly, in order to change the attitude of the tool relative to the carving direction, it is not necessary to rotate the tool itself and the decorative groove can be carved only by linearly moving the tool, thereby facilitating carving process of the decorative groove.

In the above producing method of decorative plate, a carving machine that rotates a flat material plate for carving may preferably be used in carving the decorative groove, the material plate having a decorative plate portion to be the decorative plate and a supported portion for supporting the material plate with the carving machine, where the method preferably further include the steps of: before carving, dividing the decorative portion and the supported portion while slightly retaining a connecting portion that connects the decorative portion and the supported portion and simultaneously forming a positioning portion for positioning the material plate relative to the carving machine; and separating the decorative plate portion from the supported portion of the material plate after carving.

Accordingly, when the material plate is supported by the carving machine, the supported portion engages with the carving machine to be secured to the carving machine, so that the carving machine does not touch the surface of the decorative plate portion and the entire surface thereof can be exposed, thereby carving the decorative groove on the entire decorative plate portion.

Further, since the decorative plate portion and the supported portion are divided slightly retaining the connecting portion before the carving process, it is only necessary to cut the connecting portion after the carving process, so that the separating process can be easily conducted with a small force and since no great force is applied on the decorative plate portion during separation, the decorative plate portion is not damaged during separation even when the decorative plate portion is thin In the above method, the upper surface of the connecting portion may preferably be located at a position below the upper surface of the decorative plate portion.

Accordingly, when the decorative groove is carved on the entire surface of the decorative groove portion, the tool does not touch and cut the connecting portion, thereby preventing a shift in carving position on account of the connecting portion being cut, so that the decorative plate portion can be securely carved even when the decorative plate portion and the supported portion are divided before carving.

In the above method, the workpiece carved with the decorative groove may be used as a molding matrix and the decorative groove formed on the molding matrix is transferred on a synthetic-resin made molding article.

According to the above arrangement, a large number of molded articles formed with the decorative groove can be produced in a short time using molding of synthetic resin superior in processing efficiency as compared to the carving process. Furthermore, the decorative plates having approximately the same appearance can be obtained by metal-plating the produced plate members at one time, so that the decorative plate can be mass-produced.

In the above arrangement, the workpiece having the decorative groove may be used as an electroforming matrix and after forming a conductive layer having electric conductivity on the surface of the electroforming matrix, metal may be thickly plated on the surface of the conductive layer to make an electroforming made of the metal on the surface of the conductive layer.

Mass production of the decorative plate is also possible in the above arrangement and, since the produced decorative plate is made of metal as in the decorative plate produced by carving process, the decorative plate having the same quality as carving precious metal can also be mass produced.

A third aspect of the present invention is a decorative article including a decorative plate according to first aspect of the present invention.

According to the third aspect of the present invention, since the action of the light reflected on the surface of the decorative plate is similar to the light reflected on a bulging surface, the central portion of the decorative plate can appear to be bulging, so that a three-dimensional effect can be achieved with the decorative plate even when the decorative plate is made of a thin plate, which may be attached on a decorative article or directly used as a decorative article to obtain a decorative article having depth and a luxurious touch applied to it.

A fourth aspect of the present invention is a timepiece having the decorative plate according to the first aspect of the present invention as a dial plate.

According to the fourth aspect of the present invention, since the action of the light reflected on the surface of the flat dial plate is similar to the light reflected on a bulging surface, the central portion of the dial plate appears bulging, so that a three-dimensional effect can be achieved on the dial plate even when the dial plate is made of a thin plate, thereby obtaining a timepiece having depth and having a luxurious touch to it.

DESCRIPTION OF THE PREFERRED EMBODIMENTS

Preferred embodiments of the present invention will be described below with reference to attached drawings.

First Embodiment

Figure 3:
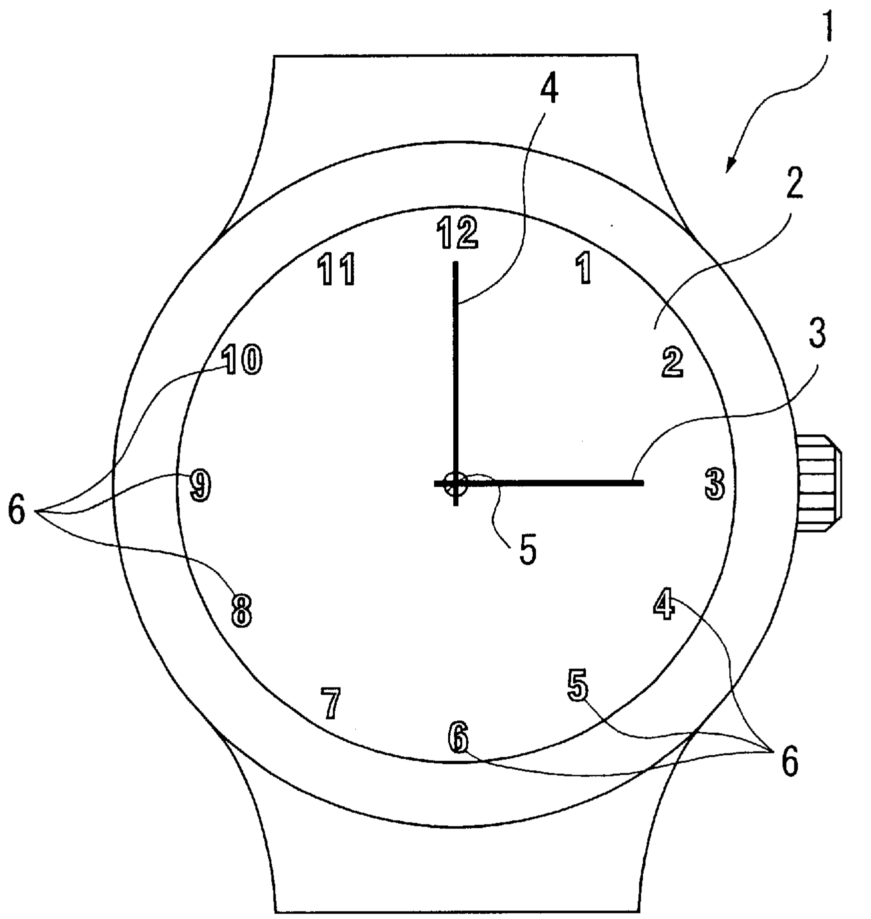
FIG. 3 is a plan view showing a timepiece according to a first embodiment of the present invention.

FIG. 3 shows a timepiece 1 according to first embodiment of the present invention. The timepiece 1 has a dial plate 2 as a decorative plate according to the present invention.

The dial plate 2 has an insert hole 5 provided at the center thereof for a drive shaft of an hour hand 3 and a minute hand 4 to be inserted, and a plurality of time displays 6 composed of numerals printed on the periphery thereof to represent time by the hour hand 3.

Figure 4:
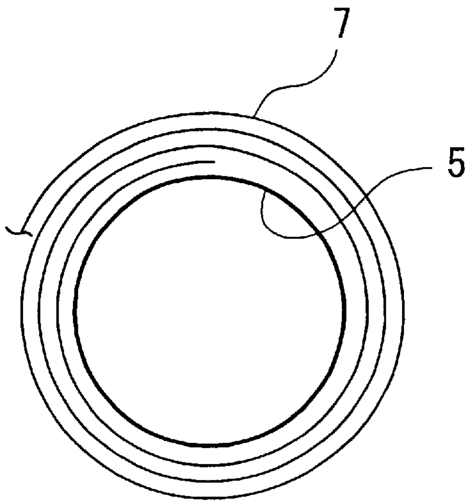
FIG. 4 is an enlarged plan view showing a primary portion of the first embodiment.

As shown in FIG. 4, a decorative groove 7 extending in spiral from an inside of the dial plate 2 to the outside thereof is carved on the entire surface thereof to make a decorative portion on the entire surface.

Figure 5:
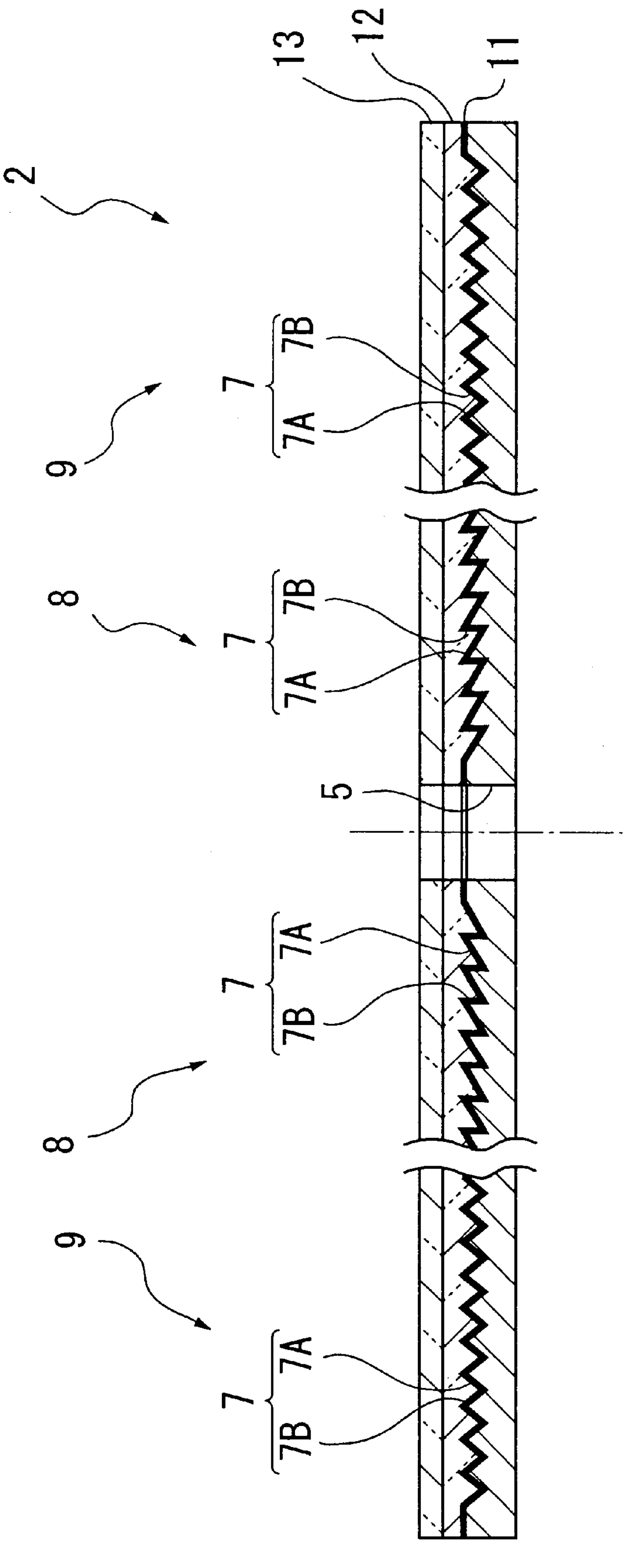
FIG. 5 is a cross section showing a dial plate of the first embodiment.

As shown in FIG. 5, the decorative groove 7 is formed in V-shape cross section.

On an inside of the spiral of the decorative groove 7, a non-equilateral portion 8 includes pairs of slanted sides composing the V-shape having an inner slanted side 7A with a relatively gentler inclination and an outside slanted side 7B with a relatively steeper inclination.

The slant angle of the slanted sides 7A and 7B of the decorative groove 7 gradually change to become equal as the spiral extends from the inner portion to the outer portion of the plate. In other words, the slant angle of the slanted side 7A varies gradually to be less steep and the slant angle of the slanted side 7B varies gradually to be less gentle.

An equilateral portion 9 having inner slanted side 7A and outer slanted side 7B with substantially equal slant angle is provided on the outside of the spiral of the decorative groove 7.

Figure 1:
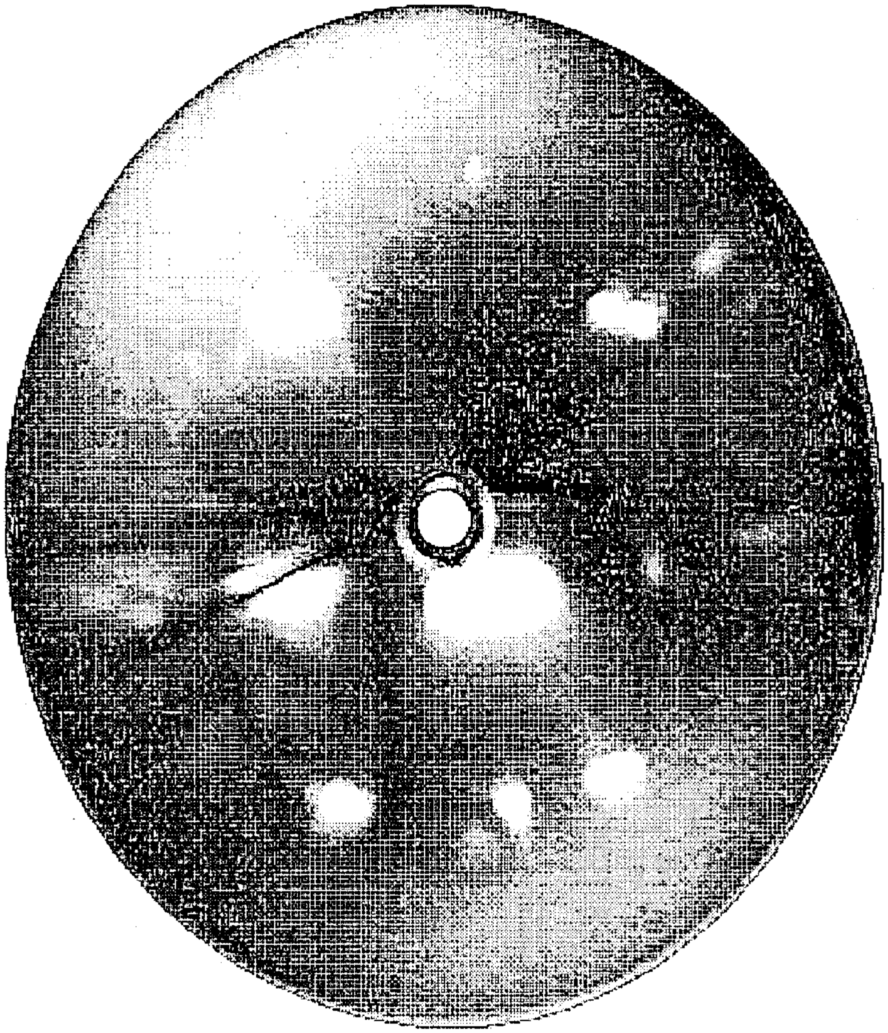
FIG. 1 is an image illustrating an effect of the present invention.

According to the decorative groove 7, the central portion of the dial plate 2 appears to bulge as shown in FIG. 1.

Referring again to FIG. 5, a decorative plating layer 11 is directly formed on the surface of the dial plate 2 having the decorative portion on the entire surface thereof. A colored coating layer 12 including a pigment is provided on the decorative plating layer 11 and a transparent coating layer 13 without a pigment is provided on the colored coating layer 12. Gold plating layer is used as the decorative plating layer 11.

The colored coating layer 12 is formed of a see-through paint through which the substrate can be seen, the color of the colored coating layer being gradually thickened from the peripheral flat-visible portion toward the central portion in gradation. The colored coating layer 12 emphasizes the three-dimensional effect created by the decorative groove 7.

The surface of the transparent coating layer 13 is ground and further polished, thereby making the surface of the dial plate 2 flat.

Figure 6:
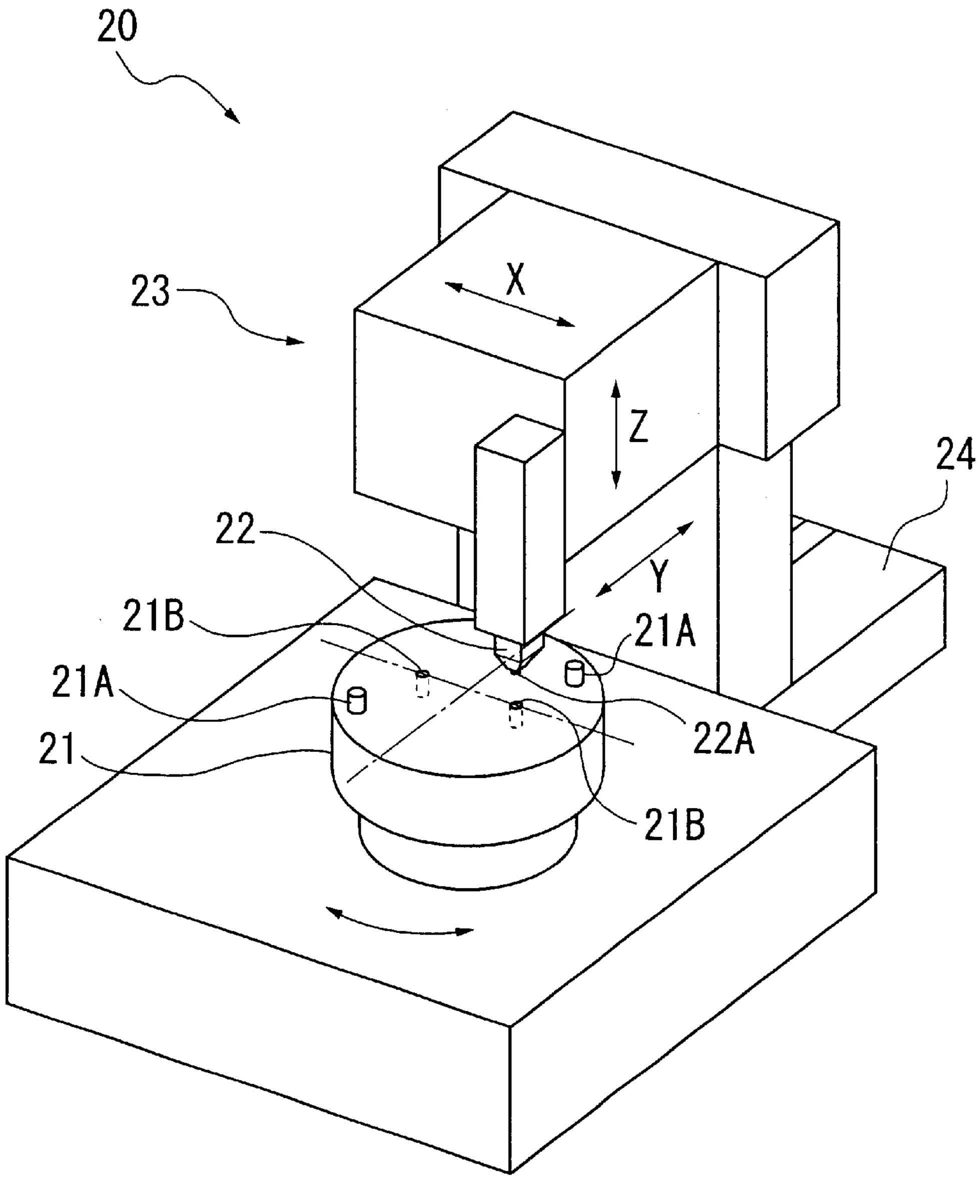
FIG. 6 is a perspective view showing a carving machine according to the first embodiment.

FIG. 6 shows a carving machine 20 for carving the decorative groove 7 on the material plate to create the dial plate 2. The carving machine 20 is a kind of lathe for carving the material plate as a workpiece while rotating the material plate. The carving machine 20 is provided with a rotary table 21 for the material plate to be attached and rotated thereon, a cutting 22 tool having a diamond tool bit 22A at a distal end thereof, a support unit 23 for supporting the cutting tool 22, and a driving unit 24 for moving the support unit 23 in Y-direction (front and back direction in the figure).

The rotary table 21 is rotated by a motor (not shown). The direction of the rotary axis is Z-axis direction (up and down direction in the figure) and the material plate is secured on a plane orthogonal with the rotary axis. Incidentally, projections 21A for determining the position of the material plate and holes 21B for receiving a support leg 36 (described below) inserted therein are provided on the plane of the rotary table 21 for securing the material plate.

The support unit 23 performs the three-dimensional position-adjusting function for adjusting the position of the cutting tool 22 in X, Y and Z-axis directions, and the vertical-moving function for raising and lowering the cutting tool 22. According to the position-adjusting function of the support unit 23, the carving initial position of the diamond tool 22A relative to the material plate can be set in any manner in respective X, Y and Z-axis directions. Further, utilizing the vertical-moving function of the support unit 23, it is possible to initiate rotation of the rotary table 21 while the cutting tool 22 is raised and to initiate carving by lowering the cutting tool 22 when the rotary table 21 reaches a predetermined rotary speed.

The driving unit 24 retracts the support unit 23 along the Y-axis direction at the same time when the cutting tool 22 is lowered to reach a carving initial position. The retraction speed of the driving unit 24 can be set at any level while being stopped and, once the driving unit 24 is actuated, the driving unit 24 retracts the support unit 23 at a predetermined speed.

Incidentally, the cutting tool 22 is raised automatically or manually after completion of carving and the support unit 23 is returned to the original or home position.

Figure 7:
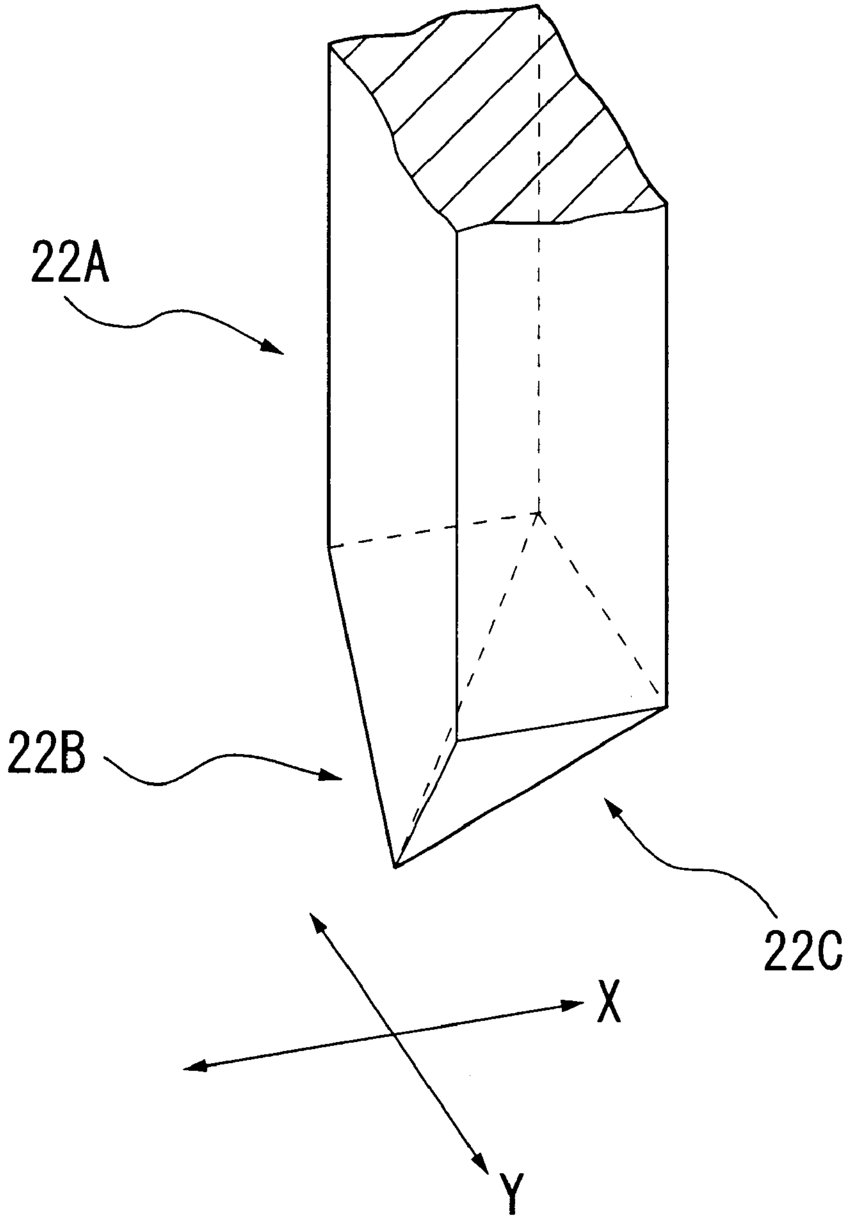
FIG. 7 is a perspective view showing an edge of a carving tool or bit according to the first embodiment.

As shown in FIG. 7, the edge of the blade of the diamond tool bit 22A has an isosceles-triangle front face (a side orthogonal with the X-axis) 22B and a right-triangle side face (a side orthogonal with the Y-axis) 22C.

Figure 8:
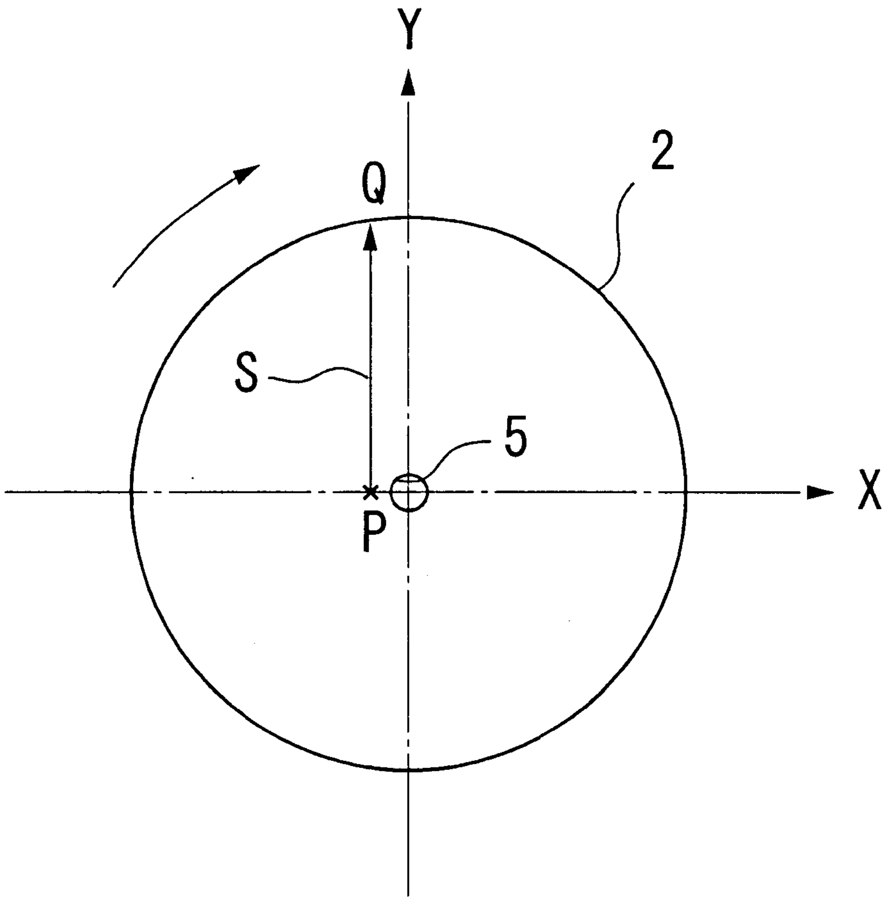
FIG. 8 is a plan view explaining a moving path of the tool according to the first embodiment.
Figure 9A:
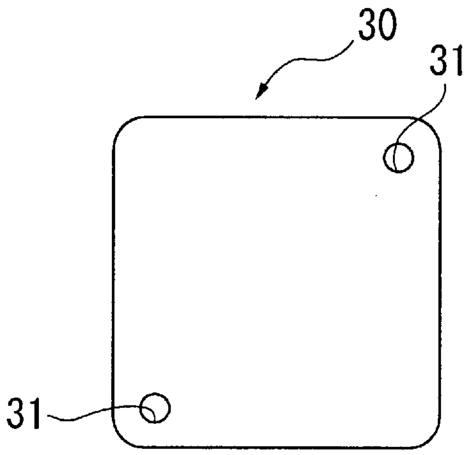
FIGS. 9A–9D is a plan view for illustrating production steps according to the first embodiment.
Figure 9B:
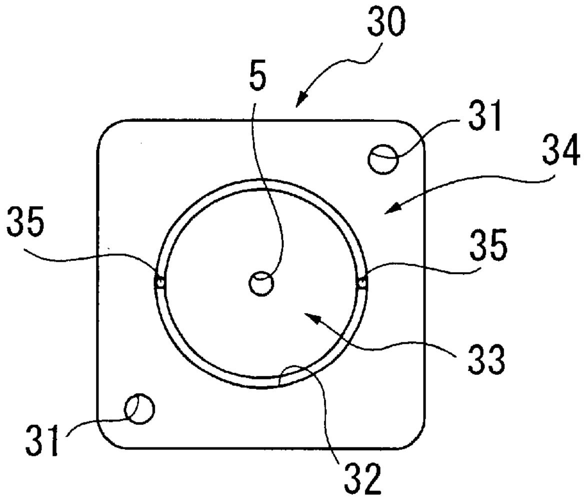
Figure 9C:
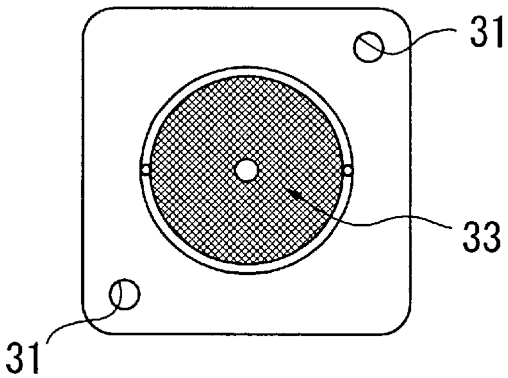
Figure 9D:
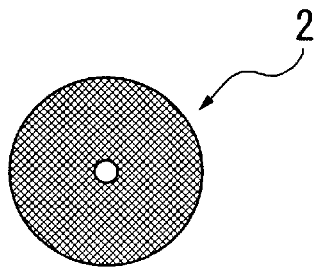
Figure 10A:
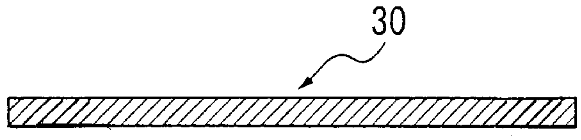
FIGS. 10A–10G is a cross section for illustrating production steps according to the first embodiment.
Figure 10B:
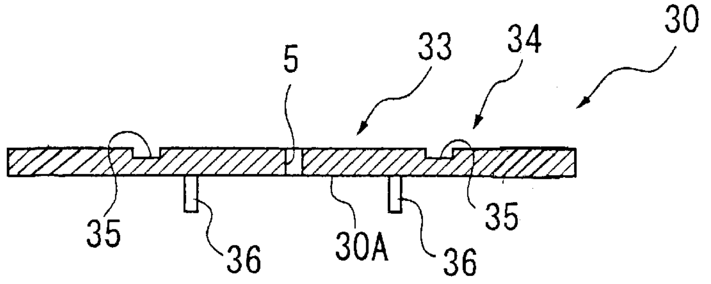
Figure 10C:
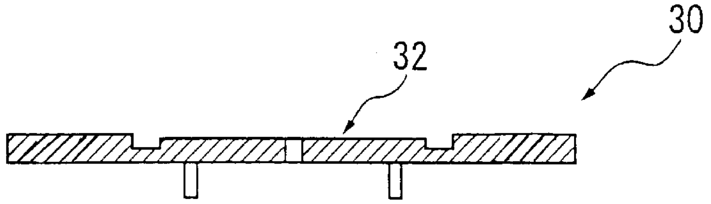
Figure 10D:
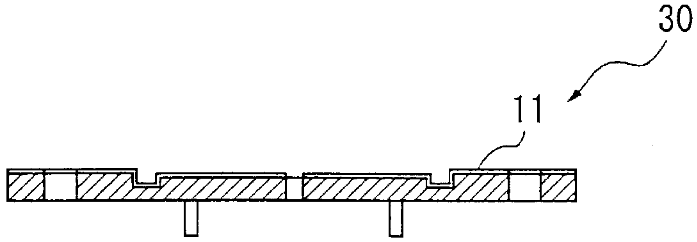
Figure 10E:
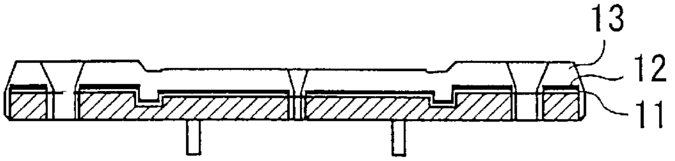
Figure 10F:
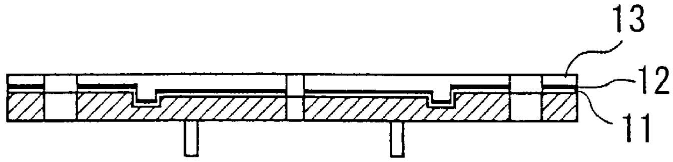
Figure 10G:
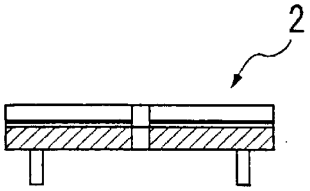

As shown in FIG. 8, moving path S of the diamond tool 22A during the carving process is set along a straight line offset from the radius of the rotary table 21 (i.e. relative to the insert hole 5 coaxial with the rotary axis of the rotary table 21). The carving starting point, as one end of the moving path S, is located at the point P on the radius of the rotary table 21 adjacent to the insert hole 5, coaxial with the rotary axis and orthogonal with the moving path S. The carving end point, as the other end of the moving path S, is located at an intersection point Q of the periphery of the dial plate 2 and the moving path S.

Accordingly, the diamond tool 22A carves the workpiece at the right-angle side face around the start point P and carves the workpiece at the isosceles-triangle front face around the end point Q.

Next, the production steps of the dial plate 2 according to the present embodiment will be described below with reference to FIGS. 9 and 10.

Initially, a primitive plate 30, to be formed as the dial plate, 2 is prepared by stamping a large-size flat metal plate in an approximate square of a predetermined size. The primitive plate 30 is, for instance, a flat square with 40 mm sides and 0.4 mm thickness, and made of brass.

As shown in FIGS. 9(*a*) and 10(*a*), pilot holes 31 of the positioning portion are made around a periphery of the primitive plate 30, specifically around the corners thereof.

Subsequently, as shown in FIGS. 9(*b*) and 10(*b*), an arc-shaped slit 32 is made on the primitive plate 30 to separate a decorative plate portion 33 to be the dial plate 2 and a supported portion 34 for supporting the primitive plate 30 on the carving machine 20.

At this time, the decorative plate portion 33 and the supported portion 34 are not completely separated and a thin connecting portion 35 for connecting the decorative plate portion 33 and the supported portion 34 is retained as shown in FIG. 10(*c*). The upper surface of the connecting portion 35 is indented toward the inside of the plate relative to the upper surface of the decorative plate portion 33.

Simultaneously with forming the slit 32, the insert hole 5 is made at the center of the decorative portion 33. Further, approximately simultaneously therewith, the stick-shaped support leg 36 to be fixed to the movement having a timepiece function is fixed by welding at a backside 30A of the primitive plate 30. Incidentally, the pilot hole 31 can be used as a guide for determining the position of the welding machine in welding the support leg 36.

Thereafter, the primitive plate 30 is fixed on the rotary table 21 of the carving machine 20 to carve the decorative groove 7 on the entire surface of the decorative plate portion 33 as shown in FIG. 9(*c*). In fixing the primitive plate 30 to the rotary table 21, the projections 21A of the rotary table 21 (see FIG. 6) are inserted into the pilot holes 31 to fix the position of the material plate relative to the rotary table 21.

After completing the carving process, the primitive plate 30 is detached from the rotary table 21 of the carving machine 20. After forming the decorative plating layer 11 on the entire surface of the primitive plate 30 as shown in FIG. 10(*d*), the colored coating layer 12 and the transparent coating layer 13 are sequentially formed on the entire surface of the primitive plate 30 as shown in FIG. 10(*e*).

Subsequently, the surface of the transparent coating layer 13 is sequentially ground and polished to make the surface of the primitive plate 30 substantially completely flat as shown in FIG. 10(*f*).

After completion of the polishing process, the connecting portion 35 is cut to separate the decorative plate portion 33 from the supported portion 34 as shown in FIGS. 9(*d*) and 10(*g*) and the time display 6 is printed on the periphery thereof to produce the dial plate 2.

According to the first embodiment, the following advantages can be obtained.

The decorative groove 7 formed in V-shape cross section extending from the inside toward the outside in a spiral is carved on the dial plate 2. The V-shape of the decorative groove 7 is formed with a pair of slanted sides where the inner slanted side 7A is of relatively gentler slant angle and the outer slanted side 7B is of relatively steeper slanted angle, thereby forming the non-equilateral portion 8 having different slant angles as between the slanted sides 7A and 7B. Accordingly, since the action of the light reflected on the surface of the flat dial plate 2 macroscopically resembles the action of the light reflected on a bulging surface, the central portion of the dial plate 2 appears bulged and the dial plate 2 giving it a three-dimensional appearance even when being produced from a thin plate, thereby giving depth and a luxurious touch to the dial plate 2.

When the timepiece 1 having such dial plate 2 is exhibited in a showcase, such timepiece can attract a person's eye since the light is always reflected therefrom.

In the decorative groove 7 the slant angle of slanted sides 7A and 7B varies gradually from the inner portion toward the outside of the spiral. Thus, the non-equilateral portion 8 is provided on the inside and the equilateral portion 9 is provided on the outside. This gives the central portion of the dial plate 2 a bulged appearance and, at the same time, the peripheral portion appears to be flat. The dial plate 2 can thereby give the impression of an apparent thickness relatively greater than the actual thickness thereof to people who see it. So, even when the dial plate 2 is made of thin plate, it appears to have a depth and it is given a luxurious touch without increasing thickness of the timepiece 1 itself.

Since the decorative plating layer 11 is provided on the entire surface of the dial plate 2, sufficient depth and luxurious touch can be applied to the decorative plate. Further, since a precious metal layer having superior corrosion resistance is used as the decorative plating layer 11, even when the dial plate 2 is made of brass, superior corrosion resistance can be applied thereto and beautiful appearance can be maintained for a long time. Further, since the dial plate 2 is made of brass that is easily carved, the decorative groove 7 can be easily carved.

The colored coating layer 12 is provided on the decorative plating layer 11 and the colored coating layer 12 is formed with a see-through paint through which the coating substrate can be seen. The colored coating layer 12 has gradation in color being thickened from an apparent bulging central portion toward the periphery of the plate. The apparent flattened peripheral portion looks like shadow so that the three-dimensional effect created by the decorative groove 7 is further emphasized. When a plurality of various color paints are prepared for forming the colored coating layer, the variety of the dial plate 2 can be easily increased by changing the color of the colored coating layer 12.

The transparent coating layer 13 that is provided on the colored coating layer 12 does not diminish the effect of the decorative groove 7 even when it is thickly coated so that the decorative groove 7 is completely covered. The entire surface of the dial plate 2 can be made substantially completely flat by polishing etc., thereby facilitating printing and setting abbreviated characters indicating time on the dial plate 2.

Since both of grinding and polishing processes are performed on the surface of the transparent coating layer 13 to make the surface of the dial plate 2 a completely flat surface without any irregularity, glossiness and transparency of the dial plate 2 can be enhanced, thereby further emphasizing the depth and adding a luxurious touch to the dial plate 2.

When the decorative groove 7 is carved, since the moving path S of the diamond tool 22A is set along a straight line offset relative to radius direction of the rotary shaft of the rotary table 21, and the start point as an end of the moving path is set on the point P adjacent to the rotary shaft and on the radius orthogonal with the moving path S, the diamond tool 22A itself does not need to be rotated and the decorative groove 7 can be carved simply by linearly moving the diamond tool 22A. Thus, the carving work of the decorative groove 7 can be facilitated and the decorative groove 7 can be carved with a general-type carving machine 20 without using a numerical controller (NC) carving machine for carving the workpiece while moving the cutting tool and the workpiece by numerical control.

The primitive plate 30 has a decorative plate portion 33 which will be the dial plate 2 and a supported portion 34 for supporting the decorative plate portion on the carving machine 20. The supported portion 34 is fixed to the rotary table 21 of the carving machine 20. Thus the primitive plate 30 can be fixed without bringing the carving machine 20 into contact with the surface of the decorative plate portion 33, so that the entire surface of the decorative plate portion 33 can be exposed and the decorative groove 7 can be carved on the entire decorative plate portion 33.

The decorative plate portion 33 and the supported portion 34 are separate except for a slight connecting portion 35 prior to and during the carving process. The decorative plate portion 33 and the supported portion 34 can be separated with a small force by cutting the connecting portion 35 after completion of the carving process. Further, since great force is not applied to the decorative plate portion 33 during separation, damage to the thin decorative plate portion 33 can be prevented.

The upper surface of the connecting portion 35 is below the upper surface of the decorative plate portion 33. Thus, the diamond tool 22A does not touch or cut the connecting portion 35 even when the decorative groove 7 is carved on the entire surface of the decorative plate portion 33. This prevents the carving position from shifting as a result of cutting the connecting portion 35, and the decorative plate portion 33 can be securely carved even when the slit 32 is made between the decorative plate portion 33 and the supported portion 34 prior to carving.

Second Embodiment

Figure 11:
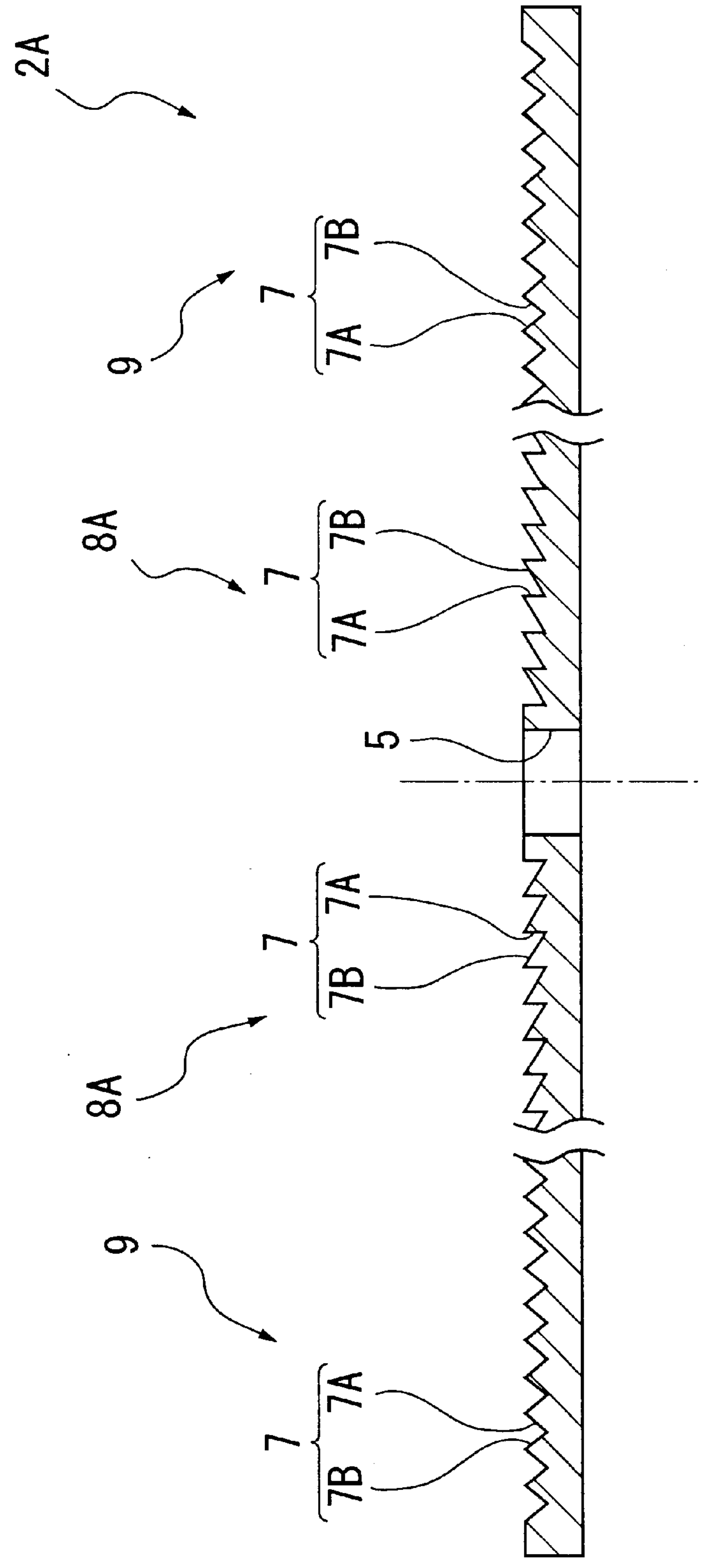
FIG. 11 is a cross section showing a dial plate according to a second embodiment of the present invention.

FIG. 11 shows a dial plate 2A according to second embodiment of the present invention. In the present second embodiment, the apparent center-bulging dial plate 2 is instead formed as an apparent center-indented dial plate 2A.

Specifically, the decorative groove 7 of the dial plate 2A is formed in V-shape cross section as shown in FIG. 11. A non-equilateral portion 8A has a pair of slanted sides forming the V-shape where the slant angle of the inner slanted side 7A is relatively steep and the slanted angle of the outside slanted side 7B is relatively gentle.

The slant angles of the slanted sides 7A and 7B of the decorative groove 7 become gradually equal from the inner part of the spiral toward the outer part thereof. In other words, the slant angle of the slanted side 7A gradually becomes gentler and the slant angle of the slanted side 7B becomes gradually steeper.

An equilateral portion 9 having inner slanted side 7A and outer slanted side 7B of substantially equal slant angle is provided on the outer part of the spiral of the decorative groove 7.

Figure 2:
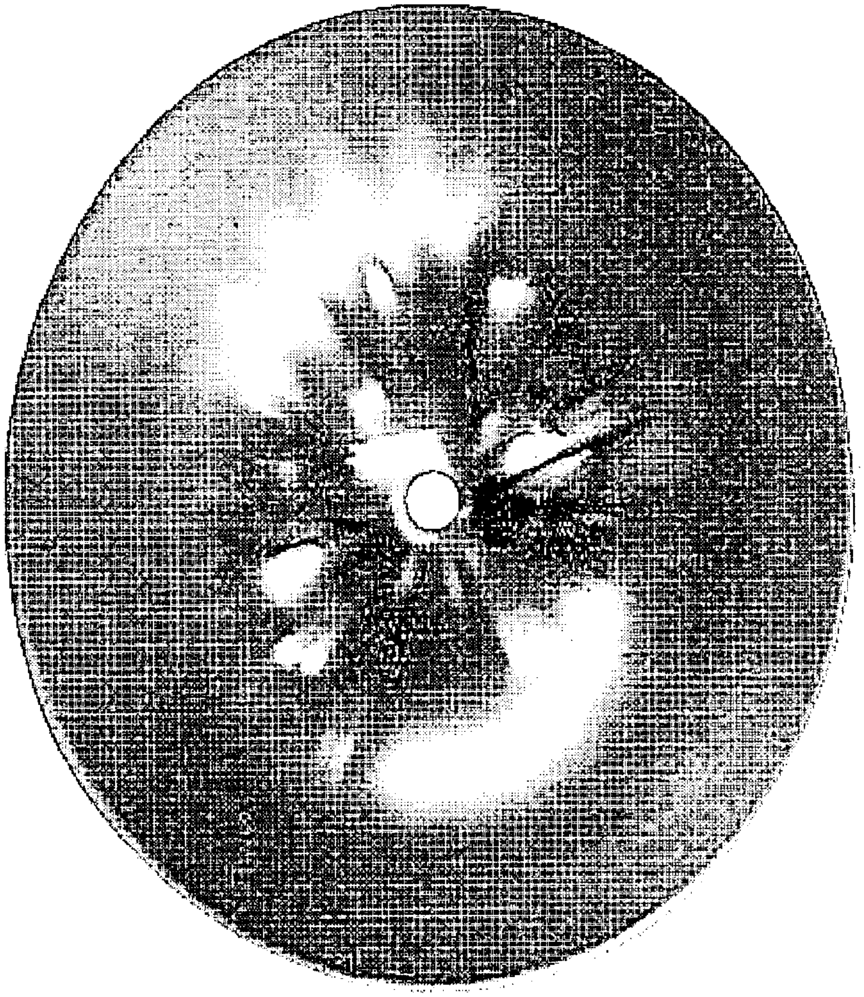
FIG. 2 is another image illustrating an effect of the present invention.

The dial plate 2A appears center-indented as a result of the decorative groove 7 as shown in FIG. 2.

Figure 12:
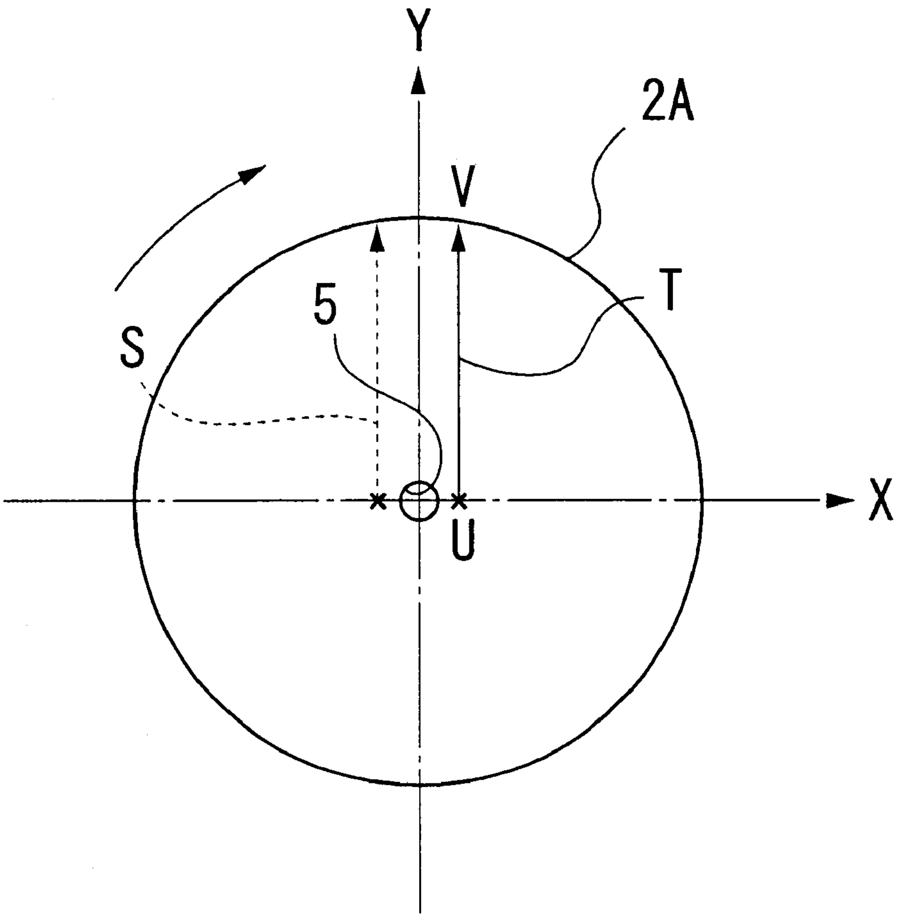
FIG. 12 is a plan view for illustrating a moving path of a tool according to the second embodiment.

Referring to FIG. 12, in order to carve the decorative groove 7 of the dial plate 2A, moving path T of the diamond tool 22A is set along a straight line offset relative to radius direction of the insert hole 5 coaxial with the rotary shaft of the rotary table 21 as in the first embodiment. However, the moving path T is set on a position opposite to the moving path S of the first embodiment relative to a diameter parallel to the Y-axis.

The start point of the moving path T is set on the point U adjacent to the insert hole 5 coaxial with the rotary shaft and on a radius orthogonal with the moving path T. The end point of the moving path T is set on a intersection point V on the periphery of the dial plate 2A and the moving path T.

Incidentally, as in the above-described first embodiment, at least one of the decorative plating layer 11, the colored coating layer 12 and the transparent coating layer 13 is provided on the surface of the dial plate 2A.

The same function and advantages as the first embodiment can be obtained in the second embodiment.

Third Embodiment

Figure 13:
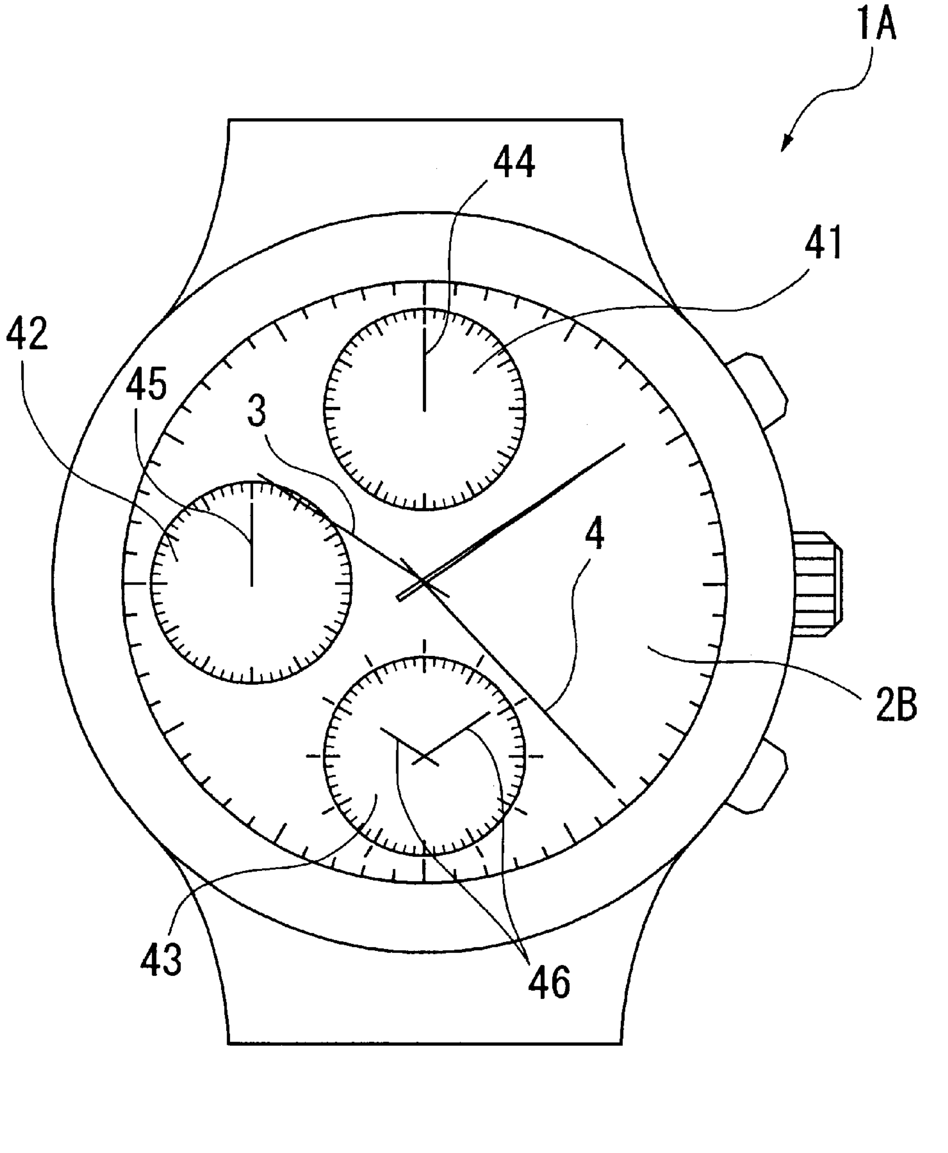
FIG. 13 is a plan view showing a timepiece according to third embodiment of the present invention.
Figure 14A:
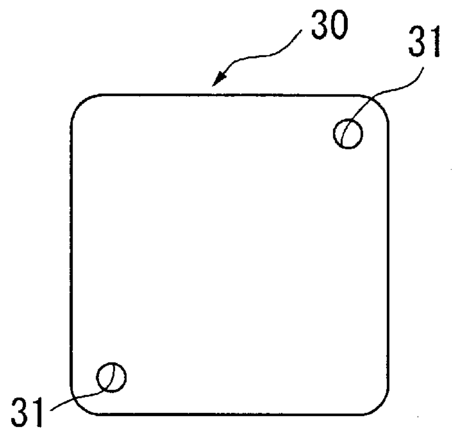
FIGS. 14A–14D is a plan view for illustrating production steps according to the third embodiment.
Figure 14B:
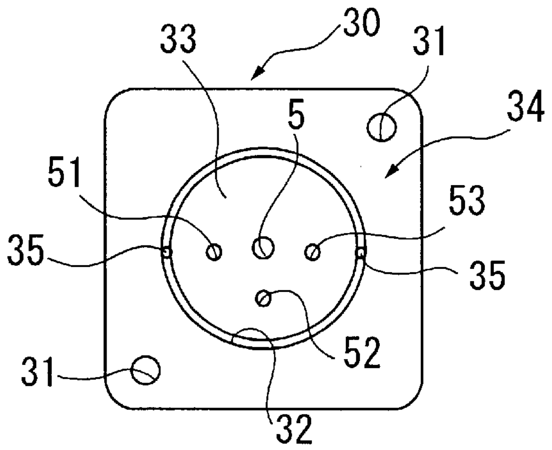
Figure 14C:
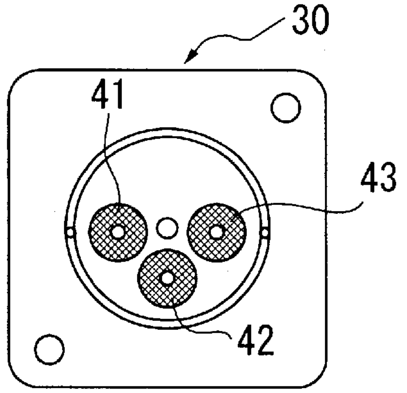
Figure 14D:
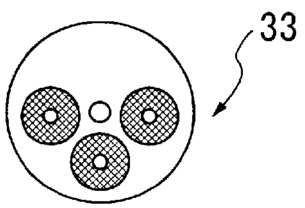

FIG. 13 shows a timepiece 1A according to third embodiment of the present invention. In the third embodiment, the dial plate 2 of which entire surface is carved with the decorative groove 7 to form the decorative portion on the entire surface thereof is substituted by a dial plate 2B where the decorative groove 7 is partially carved to form a plurality of decorative portions 41 to 43.

Specifically, the timepiece 1A shown in FIG. 13 is a multi-shaft timepiece including small hands 44 to 46, as well as the hour hand 3 and the minute hand 4 driven by a center drive shaft. Timepiece 1A is a multi-pointer timepiece such as chronograph, timer and perpetual calendar. Note that small hands 44 to 46 are not coaxial with the drive shaft of the hour hand 3 and the minute hand 4

Circular decorative portions 41 to 43 around respective drive shafts of the small hands 44 to 46 are provided on the dial plate 2B of the timepiece 1A. The above-described decorative groove 7 is carved on the respective decorative portions 41 to 43.

Next, production steps of the dial plate according to the present embodiment will be described below with reference to FIG. 14.

Initially, a large-size flat metal plate is stamped in a substantial square of a predetermined size to form primitive plate 30. At this time, as shown in FIG. 14(*a*), a pilot holes 31 of a positioning portion are made around the periphery, specifically, around the corners of the primitive plate 30.

Next, as shown in FIG. 14(*b*), arc-shaped slit 32 is formed in the primitive plate 30 to separate the decorative plate portion 33 into the dial plate 2 and the supported portion 34 for supporting the primitive plate 30 on the carving machine 20.

At this time, the decorative plate portion 33 and the supported portion 34 are not completely separated and a thin connecting portion 35 connecting the decorative plate portion 33 and the supported portion 34 is retained. The upper surface of the connecting portion 35 is below the upper surface of the decorative plate portion 33.

Simultaneously with forming the slit 32, the insert hole 5 is made at the center of the decorative portion 33 and insert holes 51 to 53 are made to receive the respective drive shafts of the small hands 44 to 46.

Further, approximately simultaneously therewith, the stick-shaped support leg 36 to be fixed to the movement having a timepiece function is fixed by welding at a backside 30A of the primitive plate 30.

Subsequently, in order to carve with the carving machine 20, the primitive plate 30 is fixed to the rotary table 21 so that the rotary shaft of the rotary table 21 and the insert hole 51 of the primitive plate 30 become coaxial, and the decorative groove 7 is carved at a portion to be the decorative portion 41 in the same manner as in the first and the second embodiments.

After completion of the carving work of the decorative portion 41, the position of the primitive plate 30 relative to the rotary table 21 is changed for sequentially carving the decorative groove 7 onto respective portions to be the decorative portions 42 and 43 to complete the decorative portions 41 to 43 as shown in FIG. 14(*c*).

Thereafter, the decorative plating layer 11, the colored coating layer 12 and the transparent coating layer 13 are sequentially formed on the entire surface of the primitive plate 30 and the grinding process and the polishing process are sequentially conducted on the surface of the transparent coating layer 13 to make the surface of the primitive plate 30 substantially completely flat. After the polishing process, the connecting portion 35 is cut to separate the decorative plate portion 33 from the supported portion 34 as shown in FIG. 14(*d*) and the time scale etc. is printed thereon to finish the dial plate 2B.

According to the third embodiment, the same functions and effects as in the first and the second embodiments can be obtained.

Fourth Embodiment

In the fourth embodiment of the present invention, the brass-carving dial plate 2 of the first embodiment is changed to a dial plate formed of a molded synthetic resin. The dial plate according to the fourth embodiment has the same structure as the dial plate 2 of the first embodiment (see FIG. 5), so that description thereof is omitted and the producing method thereof will be described below in detail.

In the fourth embodiment, the decorative plate portion 33 as a workpiece having been carved with the decorative groove 7 thereon in the first embodiment is used as a molding matrix.

Specifically, in the fourth embodiment, in order to secure the strength of the molding matrix, a decorative plate portion (made of brass) of an increased thickness of 5 mm, for example and having a 60 mm diameter, for example can be used. The molded article molded therefrom may be polycarbonate plate 60 formed in 0.4 mm thickness and 60 mm diameter, for example.

Figure 15A:
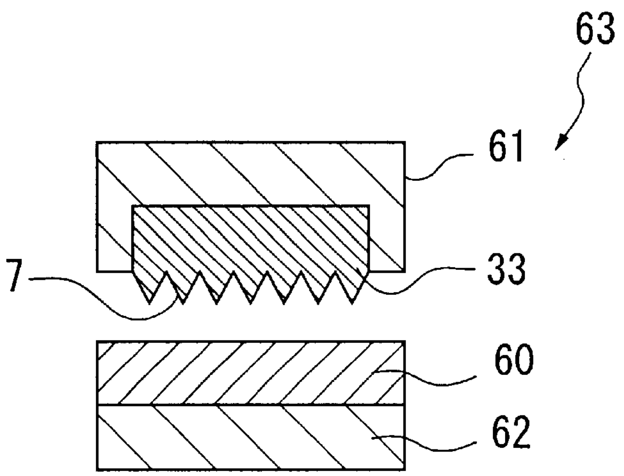
FIGS. 15A–15C is a cross section for illustrating production steps according to fourth embodiment.
Figure 15B:
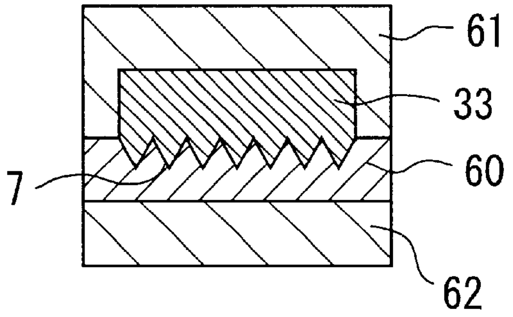
Figure 15C:
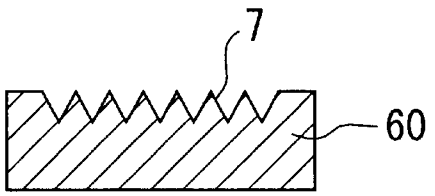
Figure 16A:
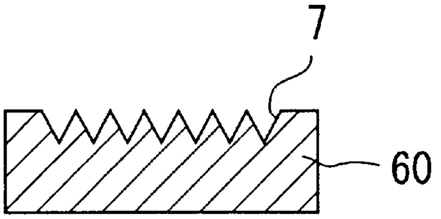
FIGS. 16A–16D is a cross section for illustrating production steps according to fifth embodiment.
Figure 16B:
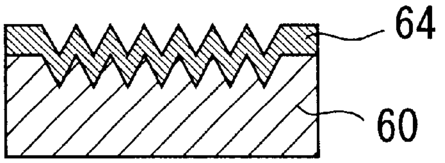
Figure 16C:
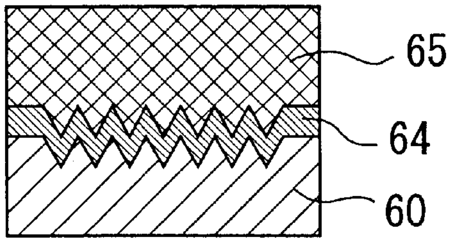
Figure 16D:
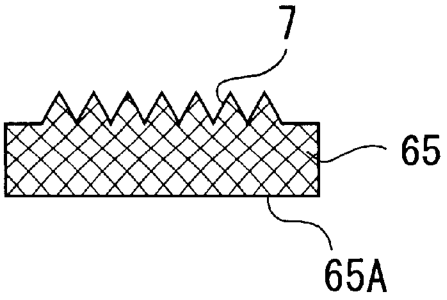

Referring to FIG. 15(*a*), the molding device for molding the synthetic resin is a molding machine 63 having a heating plate 61, also used as a holding-jig for holding the molding matrix, and a heating plate 62 opposed to the heating plate 61 and onto which the plate 60 is set. The heating plates 61 and 62 are capable of moving toward and away from each other (e.g. the heating plate 61 is movable relative to the heating plate 62).

Incidentally, although the slant angles of a pair of slanted sides of the decorative groove 7 are not actually equal as described with reference to other embodiments, the pairs of slanted sides of the decorative groove 7 forming the V-shape in FIG. 15 are illustrated to have equal slant angles for convenience.

In producing the dial plate of the fourth embodiment, the decorative plate portion 33 as the molding matrix is set on the heating plate 61 as shown in FIG. 15(*a*) and the plate 60 is set on the heating plate 62.

Next, the heating plates 61 and 62 are heated to raise the temperature of the heating plates 61 and 62 to 150° C., for example, and, while maintaining the temperature, the heating plate 61 is advanced toward the heating plate 62 as shown in FIG. 15(*b*) to press the decorative plate portion 33 against the plate 60, wherein the plate 60 is pressurized for five minutes with 500 kPa pressure, to transfer the decorative groove 7 of the decorative plate portion 33 onto the plate 60.

Subsequently, when the plate 60 is sufficiently cooled, as shown in FIG. 15(*c*), the plate 60 is detached from the heating plate 62 and the decorative plating layer 11, the colored coating layer 12 and the transparent coating layer 13 are sequentially formed on the plate member transferred with the decorative groove 7 to finish the decorative plate.

Incidentally, in the fourth embodiment, not only the decorative plate portion 33 of the first embodiment but also the decorative plate portion formed with the decorative groove 7 in the second embodiment can be used as the molding matrix.

The decorative plating layer 11, the colored coating layer 12 and the transparent coating layer 13 may be omitted from the plate 60 and a luminous timepiece may be manufactured by disposing a dial plate directly on an electroluminescence element using the transparent plate 60, so that luminous contrast varies from the inside toward the outside, thereby obtaining a three-dimensionally illuminating timepiece.

According to the fourth embodiment, the same function and advantages as in the first and the second embodiments can be obtained. Further, since a large number of plates 60 formed with the decorative groove 7 can be produced in a short time using molding of synthetic resin, superior processing efficiency can be achieved as compared to the carving process. Furthermore, the decorative plates having approximately the same appearance can be obtained by metal-plating the produced plate 60 at the same time, so that the decorative plate can be mass-produced.

Fifth Embodiment

In fifth embodiment of the present invention, the brass-carved dial plate 2 in the first embodiment is substituted with a precious-metal dial plate manufactured by electroforming. The dial plate according to the fifth embodiment has the same structure as the dial plate 2 of the first embodiment (see FIG. 5), so that description of the structure thereof is omitted and production method thereof will be described below in detail.

In the fifth embodiment, the plate 60 as a molded article having been transferred with the decorative groove 7 in the fourth embodiment is used as an electroforming matrix.

Incidentally, though the slant angles of the pair of slanted sides of the decorative groove 7 are not actually equal, the pair of slanted sides of the decorative groove 7 forming V-shape in FIG. 16(*a*) are illustrated to have equal slant angles for convenience.

In order to produce the dial plate of the fifth embodiment, a conductive film 64 having conductivity is formed on the surface of the plate 60 by vacuum evaporation as shown in FIG. 16(*b*).

Subsequently, precious metal is densely plated on the surface of the conductive layer 64 formed on the plate 60 as shown in FIG. 16(*c*) to form an electroforming 65 composed of the precious metal on the surface of the conductive layer 64. When the thickness of the electroforming 65 exceeds a predetermined dimension, the electroforming 65 is detached from the plate 60 as an electroforming matrix. A back side 65A of the electroforming 65 is polished and finished as shown in FIG. 16(*d*), thereby completing the electroforming as a decorative plate.

Incidentally, the electroforming composed of metal other than precious metal may be produced in the fifth embodiment. When the electroforming is produced using the metal other than precious metal, the decorative plating layer 11, the colored coating layer 12 and the transparent coating layer 13 in the first embodiment may be sequentially formed on the electroforming formed with the decorative groove 7.

According to the fifth embodiment, the same function and advantages as in the first, the second and the fourth embodiments can be obtained. Further, since the decorative plate is produced using electroforming having superior production efficiency as compared to the carving process, the decorative plate can be produced in a mass. Furthermore, the produced decorative plate is made of metal as in the decorative plate produced by carving process, so that the decorative plates of the same quality as the carved decorative plate made of precious metal can be produced in a mass.

Incidentally, the scope of the present invention is not restricted to the respective embodiments, but includes improvements and modifications as long as an object of the present invention can be achieved.

For instance, the decorative plate produced by carving may not include all or any of the decorative plating layer, the colored coating layer and the transparent coating layer, but may include none or only one or more of the decorative plating layer, the colored coating layer and the transparent coating layer.

The material of the material plate of the decorative plate made by carving process is not limited to brass, but metal such as copper, bronze, German silver and aluminum, synthetic resin, glass, shell such as mother of pearl black and mother of pearl and precious stone, and composite material made by attaching thin plates of the above materials may be used.

Further, the material of the decorative plating layer is not limited to gold, but may be silver, rhodium and nickel.

The molded article to be the decorative plate is not limited to polycarbonate, but also may be made of other synthetic resin such as polyacetal, acryl, polypropylene and ABS.

The decorative plate produced by molding process does not require all of the decorative plating layer, the colored coating layer and the transparent coating layer, and all or some of the decorative plating layer, the colored coating layer and the transparent coating layer may be omitted. For instance, when a solar cell is disposed on the backside of the dial plate, a decorative plate may preferably be made by molding transparent synthetic resin and all of the decorative plating layer, the colored coating layer and the transparent coating layer may preferably be omitted.

Figure 17:
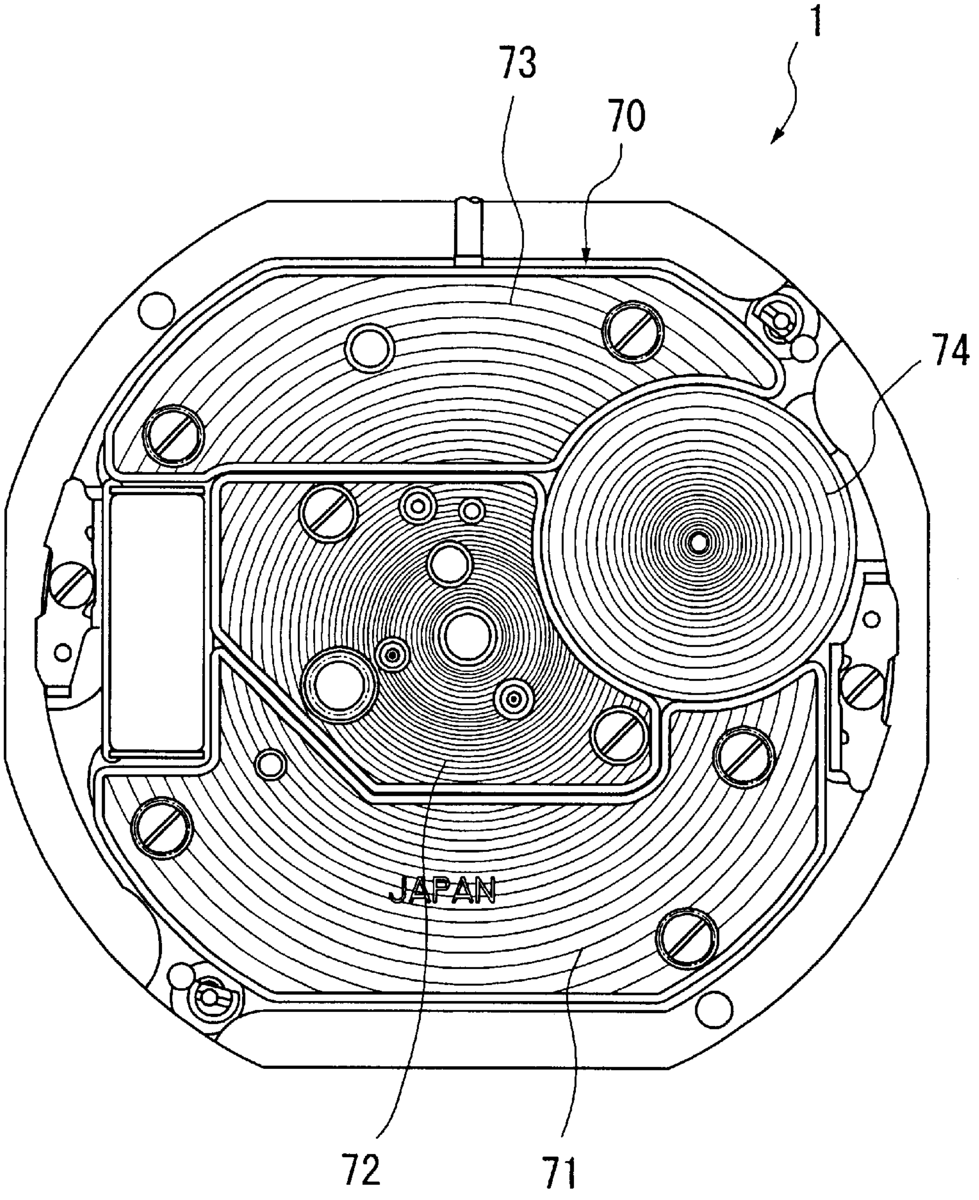
FIG. 17 is a plan view showing a modification of the present invention.

The decorative portion may not be restricted to be on the dial plate of the timepiece, but the decorative portion may be provided on the case or a bottom surface of back cover (a surface in contact with user) of a timepiece. For instance, as shown in FIG. 17, holding plates 71, 72 and 73 provided on the back cover side of movement 70 of the timepiece for holding quartz oscillator, gear train and electric circuit may be arranged as the decorative portion. The holding plates 71, 72 and 73 may preferably be integrated and the decorative groove may preferably be carved around a rotation center of the movement 70. The surface of a button battery 74 may also be arranged as the decorative portion.

The usage of the decorative plate is not restricted to the dial plate of a timepiece, but may be dial plate of a gauge, knob of furniture or of an electric appliance etc., and may be a decorative article such as a necklace, cuff links or necktie pin.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A decorative plate, comprising:

a decorative portion including a decorative groove extending in a spiral from an inner portion to an outer portion of the decorative plate, the decorative groove having a V-shaped cross section formed by a pair of slanted sides each having a slant angle and including a non-equilateral portion where a slant angle of one of the pair of slanted sides forming the V-shape is different from a slant angle of the other of the pair of slanted sides, and wherein the slant angles of the pair of slanted sides of the decorative groove vary from the inner portion toward the outer portion to gradually become equal to each other toward the outer portion.

2. The decorative plate according to claim 1, further comprising a decorative plating layer on at least the decorative portion.

3. The decorative plate according to claim 1, further comprising a colored coating layer, including a pigment, on the decorative portion.

4. The decorative plate according to claim 1, further comprising a pigment-free transparent coating layer on the decorative portion.

5. The decorative plate according to claim 4, wherein the transparent coating layer comprises a surface that is at least one of ground and polished.

6. A decorative article comprising a decorative plate, the decorative plate comprising:

a decorative portion including a decorative groove extending in a spiral from an inner portion to an outer portion of the decorative plate, the decorative groove having a V-shaped cross section formed by a pair of slanted sides each having a slant angle and including a non-equilateral portion where a slant angle of one of the pair of slanted sides forming the V-shape is different from a slant angle of the other of the pair of slanted sides, and wherein the slant angles of the pair of slanted sides of the decorative groove vary from the inner portion toward the outer portion to gradually become equal to each other toward the outer portion.

7. A timepiece comprising a decorative plate, the decorative plate comprising:

a decorative portion including a decorative groove extending in a spiral from an inner portion to an outer portion of the decorative plate, the decorative groove having a V-shaped cross section formed by a pair of slanted sides each having a slant angle and including a non-equilateral portion where a slant angle of one of the pair of slanted sides forming the V-shape is different from a slant angle of the other of the pair of slanted sides, and wherein the slant angles of the pair of slanted sides of the decorative groove vary from the inner portion toward the outer portion to gradually become equal to each other toward the outer portion.

* * * * *